July 28, 1931.  C. P. VAUCLAIN  1,816,801
AXLE BOX BEARING
Filed April 24, 1929
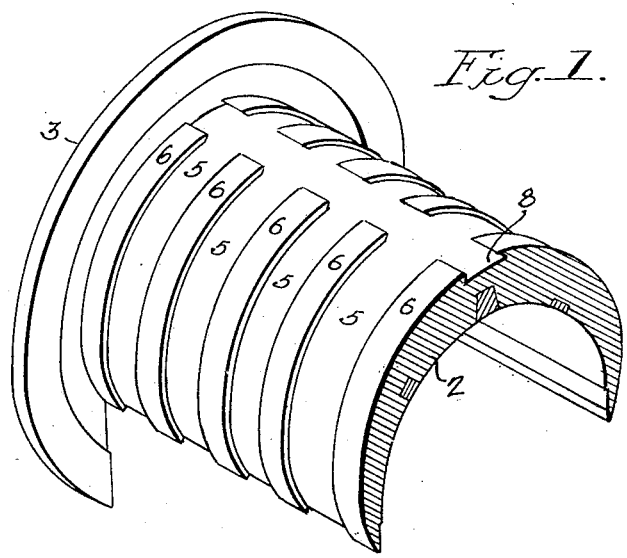
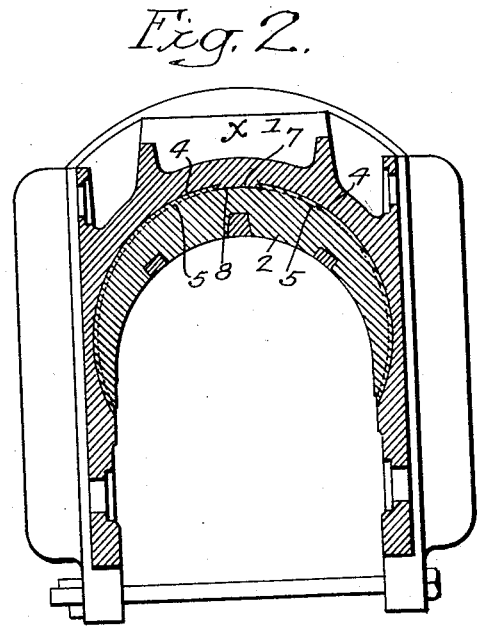
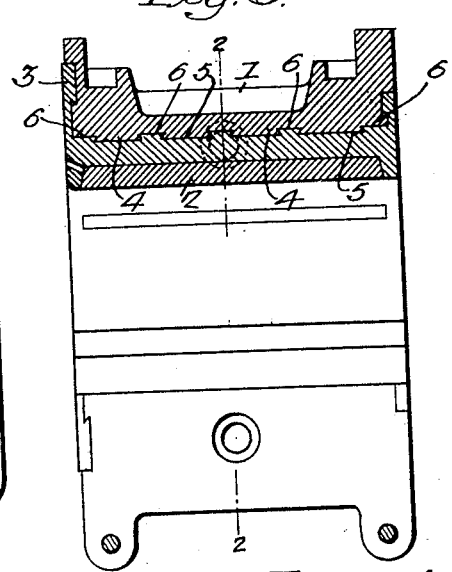
Inventor:
Charles P. Vauclain
by his Attorneys.

Patented July 28, 1931

1,816,801

UNITED STATES PATENT OFFICE

CHARLES PARRY VAUCLAIN, OF DREXEL HILL, PENNSYLVANIA

AXLE BOX BEARING

Application filed April 24, 1929. Serial No. 357,750.

The object of my invention is to make an axle box bearing in such manner that it can be firmly secured to the axle box and yet will be free to shrink circumferentially in the pouring of the brass. This object I attain in the following manner, reference being had to the accompanying drawings, in which:

Fig. 1 is a perspective view of my improved axle box bearing;

Fig. 2 is a sectional view on the line 2—2, Fig. 3; and

Fig. 3 is a longitudinal sectional view of the axle box with the bearing in position.

My invention, in the present instance, is shown in connection with the box for a driving axle of a locomotive.

1 is the box, which may be of any suitable type, and 2 is the bearing which is made of brass, bronze or other suitable material, and is shaped to fit the box as shown in Figs. 2 and 3. In the present instance the bearing has a flange 3 forming a wear plate for the wheel which is mounted on the axle.

On the interior of the box is a series of undercut ribs 4, extending transversely from each side of the centre $x$ of the box, and in the bearing is a series of grooves 5 which are formed by a series of undercut ribs 6. The grooves 5 conform to the undercut ribs 4 on the box, and in the present instance I provide a single longitudinal rib 7 which may be undercut as shown and which extends into the longitudinal groove 8 in the bearing. This rib tends to hold the bearing in a central position, but the bearing is free to shrink circumferentially to the centre of the box.

It will be understood that the bearing, which is made of brass, bronze or other suitable material, is cast in the box, the form of the bearing being clearly shown in the perspective view Fig. 1 after it has been cast in the box.

The bearing can be worn until it is comparatively close to the ribs 4 of the box, when the remaining portion of the bearing can be readily removed from the box in any manner desired and another bearing cast in its place.

By making the bearing in the manner shown, it is not liable to crack or break due to unevenness in shrinking, as the bearing is entirely free to shrink on either side of the centre $x$, as there are no obstructing ribs or projections which would interfere with the free shrinkage. The bearing, owing to the circumferential ribs, will not permit the brass to become loose, maintaining a firm fit until it is entirely worn away.

I claim:

The combination in an axle box having an opening for an axle and having a series of undercut circumferential ribs, and having a longitudinal undercut rib at the centre, said box having an undercut rib at one end and a rib at the other end; and a bearing cast in the box and held in the central position by the central rib but free to shrink at either side of the centre of the box.

CHARLES PARRY VAUCLAIN.